United States Patent
Lewis et al.

(10) Patent No.: US 10,304,210 B2
(45) Date of Patent: May 28, 2019

(54) METHOD AND APPARATUS FOR CAMERA CALIBRATION

(71) Applicant: GM GLOBAL TECHNOLOGY OPERATIONS LLC, Detroit, MI (US)

(72) Inventors: Allan Lewis, Windsor (CA); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 15/605,470

(22) Filed: May 25, 2017

(65) Prior Publication Data

US 2018/0342082 A1 Nov. 29, 2018

(51) Int. Cl.
| | | |
|---|---|---|
| G06T 7/80 | (2017.01) | |
| H04N 17/00 | (2006.01) | |
| G06T 7/10 | (2017.01) | |
| G06T 7/70 | (2017.01) | |
| B60R 1/00 | (2006.01) | |

(52) U.S. Cl.
CPC .................. *G06T 7/80* (2017.01); *B60R 1/00* (2013.01); *G06T 7/10* (2017.01); *G06T 7/70* (2017.01); *H04N 17/002* (2013.01); *B60R 2300/308* (2013.01); *B60R 2300/402* (2013.01); *B60R 2300/808* (2013.01)

(58) Field of Classification Search
None
See application file for complete search history.

(56) References Cited

U.S. PATENT DOCUMENTS

| | | | | |
|---|---|---|---|---|
| 8,373,763 B2* | 2/2013 | Zhang | ....................... | B60R 1/00 |
| | | | | 348/176 |
| 2004/0016870 A1* | 1/2004 | Pawlicki | ............... | B60W 30/18 |
| | | | | 250/208.1 |
| 2009/0290032 A1* | 11/2009 | Zhang | ....................... | B60R 1/00 |
| | | | | 348/211.9 |
| 2009/0295711 A1* | 12/2009 | Nakamura | ................. | G06T 7/55 |
| | | | | 345/156 |
| 2011/0157373 A1* | 6/2011 | Ye | .............................. | G06T 7/85 |
| | | | | 348/187 |
| 2011/0216194 A1* | 9/2011 | Kosaki | ..................... | H04N 7/18 |
| | | | | 348/148 |

(Continued)

FOREIGN PATENT DOCUMENTS

| | | | | |
|---|---|---|---|---|
| JP | 2008131250 A | * 6/2008 | ............... | H04N 7/18 |
| WO | WO-2012139636 A1 | * 10/2012 | ............... | G06T 7/80 |

(Continued)

*Primary Examiner* — Reza Aghevli (57) ABSTRACT

A method and apparatus for calibrating a camera are provided. The method includes: detecting at least one edge of fixed object in image received from a camera, determining at least one horizontal midpoint of the at least one edge, calculating a first pixel distance between the determined at least one horizontal midpoint and a pre-stored at least one horizontal midpoint, calculating second pixel distances between a plurality of points on the detected at least one edge of the fixed object and a pre-stored plurality of points of the at least one edge of the fixed object, determining whether to recalibrate the camera based on the first pixel distance and the second pixel distances, and recalibrating the camera if the determining determines to recalibrate the camera.

16 Claims, 4 Drawing Sheets

(56) References Cited

U.S. PATENT DOCUMENTS

| | | | | |
|---|---|---|---|---|
| 2011/0228104 A1* | 9/2011 | Nelson | ............. | H04N 9/3147 |
| | | | | 348/190 |
| 2011/0310250 A1* | 12/2011 | Inui | ............. | B60R 1/00 |
| | | | | 348/175 |
| 2012/0002057 A1* | 1/2012 | Kakinami | ............. | G06T 7/85 |
| | | | | 348/187 |
| 2012/0121135 A1* | 5/2012 | Kotake | ............. | G01S 5/163 |
| | | | | 382/103 |
| 2012/0148100 A1* | 6/2012 | Kotake | ............. | G06T 7/75 |
| | | | | 382/103 |
| 2013/0108116 A1* | 5/2013 | Suzuki | ............. | G01B 11/002 |
| | | | | 382/106 |
| 2013/0259403 A1* | 10/2013 | Osinusi | ............. | G06K 9/3208 |
| | | | | 382/294 |
| 2013/0271577 A1* | 10/2013 | Watanabe | ............. | H04N 13/275 |
| | | | | 348/46 |
| 2014/0043473 A1* | 2/2014 | Gupta | ............. | H04N 17/00 |
| | | | | 348/135 |
| 2014/0104437 A1* | 4/2014 | Chao | ............. | H04N 17/002 |
| | | | | 348/187 |
| 2014/0193039 A1* | 7/2014 | Wexler | ............. | G01C 11/04 |
| | | | | 382/106 |
| 2015/0279035 A1* | 10/2015 | Wolski | ............. | G01B 11/0608 |
| | | | | 348/148 |
| 2017/0124405 A1* | 5/2017 | Gupta | ............. | G06K 9/00805 |

FOREIGN PATENT DOCUMENTS

| | | | | |
|---|---|---|---|---|
| WO | WO-2012145818 A1 * | 11/2012 | ............. | H04N 17/00 |
| WO | WO-2017116570 A1 * | 7/2017 | ............. | B60R 1/00 |

* cited by examiner

METHOD AND APPARATUS FOR CAMERA CALIBRATION

INTRODUCTION

Apparatuses and methods consistent with exemplary embodiments relate to calibrating cameras. More particularly, apparatuses and methods consistent with exemplary embodiments relate to calibrating vehicle cameras.

SUMMARY

One or more exemplary embodiments provide a method and an apparatus that detect whether a camera needs recalibration and that recalibrate a camera if the camera needs recalibration. More particularly, one or more exemplary embodiments provide a method and an apparatus that detect whether a camera needs recalibration based on an image of the camera and that recalibrate the camera as needed.

According to an aspect of an exemplary embodiment, a method for calibrating a camera is provided. The method includes detecting at least one edge of fixed object in image received from a camera, determining at least one horizontal midpoint of the at least one edge, calculating a first pixel distance between the determined at least one horizontal midpoint and a pre-stored at least one horizontal midpoint, calculating second pixel distances between a plurality of points on the detected at least one edge of the fixed object and a pre-stored plurality of points of the at least one edge of the fixed object, determining whether to recalibrate the camera based on the first pixel distance and the second pixel distances, and recalibrating the camera if the determining determines to recalibrate the camera.

The fixed object comprises may be a vehicle bed, the plurality of points may correspond to the corners of the vehicle bed, and the determining the at least one horizontal midpoint of the at least one edge may include determining a horizontal midpoint of an edge corresponding to a gate of the vehicle bed and a horizontal midpoint of an edge corresponding to a side opposite the gate of the vehicle bed.

The fixed object may be a bumper, the determining the at least one horizontal midpoint of the at least one edge may include determining a horizontal midpoint of an edge corresponding to the bumper, and the plurality of points are points on the bumper corresponding to one or more from among: a) a first end of the bumper and a second end of the bumper; and b) a point between the horizontal midpoint and the first end of the bumper and a point between the horizontal midpoint and the second end of the bumper.

The determining whether to recalibrate the camera based on the first pixel distance and the second pixel distances may include determining whether the first pixel distance or the second pixel distances are greater than a predetermined threshold distance.

The determining whether to recalibrate the camera based on the first pixel distance and the second pixel distances may include determining whether an affine movement has occurred based on the determined horizontal midpoint and the plurality of points on the at least one edge of the fixed object.

The recalibrating the camera may include transforming the received image and re-cropping the transformed image.

The transforming the received image includes performing an affine transformation on the received image based on the first pixel distance between the determined at least one horizontal midpoint and a pre-stored at least one horizontal midpoint and the second pixel distances between a plurality of points on the detected at least one edge of the fixed object and a pre-stored plurality of points of the at least one edge of the fixed object.

The camera includes a camera imaging an area behind a vehicle including the vehicle bumper or a camera imaging an area including a vehicle bed.

The plurality of points may include four points or six points.

According to an aspect of an exemplary embodiment, a method for calibrating a camera is provided. The method includes detecting at least one edge of fixed object in image received from a camera, determining at least one midpoint of the at least one edge, calculating a first pixel distance between the determined at least one midpoint and a pre-stored at least one midpoint, calculating second pixel distances between a plurality of points on the detected at least one edge of the fixed object and a pre-stored plurality of points of the at least one edge of the fixed object, determining whether to recalibrate the camera based on the first pixel distance and the second pixel distances, and recalibrating the camera if the determining determines to recalibrate the camera.

According to an aspect of an exemplary embodiment, an apparatus for calibrating a camera is provided. The apparatus includes at least one memory comprising computer executable instructions and at least one processor configured to read and execute the computer executable instructions. The computer executable instructions may cause the at least one processor to detect at least one edge of fixed object in image received from a camera, determine at least one horizontal midpoint of the at least one edge, calculate a first pixel distance between the determined at least one horizontal midpoint and a pre-stored at least one horizontal midpoint, calculate second pixel distances between a plurality of points on the detected at least one edge of the fixed object and a pre-stored plurality of points of the at least one edge of the fixed object, determine whether to recalibrate the camera based on the first pixel distance and the second pixel distances, and recalibrate the camera if the determining determines to recalibrate the camera.

The fixed object may be a vehicle bed, the plurality of points may correspond to the corners of the vehicle bed, and the computer executable instructions may cause the at least one processor to determine the at least one horizontal midpoint of the at least one edge by determining a horizontal midpoint of an edge corresponding to a gate of the vehicle bed and a horizontal midpoint of an edge corresponding to a side opposite the gate of the vehicle bed.

The fixed object may be a bumper, the plurality of points may be points on the bumper corresponding to one or more from among: a) a first end of the bumper and a second end of the bumper; and b) a point between the horizontal midpoint and the first end of the bumper and a point between the horizontal midpoint and the second end of the bumper, and the computer executable instructions may cause the at least one processor to determine the at least one horizontal midpoint of the at least one edge by determining a horizontal midpoint of an edge corresponding to the bumper.

The computer executable instructions may cause the at least one processor to determine whether to recalibrate the camera based on the first pixel distance and the second pixel distances by determining whether the first pixel distance or the second pixel distances are greater than a predetermined threshold distance.

The computer executable instructions may further cause the at least one processor to determine whether to recalibrate the camera based on the first pixel distance and the second pixel distances by further determining whether an affine movement has occurred based on the determined horizontal midpoint and the plurality of points on the at least one edge of the fixed object.

The computer executable instructions may further cause the at least one processor to recalibrate the camera by transforming the received image and re-cropping the transformed image.

The computer executable instructions may further cause the at least one processor to transform the received image by performing an affine transformation on the received image based on the first pixel distance between the determined at least one horizontal midpoint and a pre-stored at least one horizontal midpoint and the second pixel distances between a plurality of points on the detected at least one edge of the fixed object and a pre-stored plurality of points of the at least one edge of the fixed object.

The apparatus may further include a camera imaging an area behind a vehicle including the vehicle bumper.

The apparatus may include a camera imaging an area including a vehicle bed.

The plurality of points may include four points or six points.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

An apparatus and method for calibrating a camera will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Cameras are being mounted on vehicles such as trucks, automobiles, scooters, bicycles, boats, airplanes, etc. These cameras are calibrated and used to provide guidance information to an operator of a vehicle. One type of guidance information may be used by an operator to guide a vehicle to a line up a trailer hitch to an attachment point of a trailer. Some examples of trailers that may be towed by a vehicle include a fifth-wheel type, a gooseneck type, or a standard low mount coupler trailer. The trailer hitch may be located in a bed of a vehicle, e.g. a truck bed, or at a rear of a vehicle near the bumper. However, when a camera or other image sensor moves or becomes misaligned, the guidance information and/or image from the camera may be incorrectly displayed.

To address the above issue, an image provided by a camera such as a rear view camera, a rear-facing camera, a center high mount stop lamp (CHMSL) camera, a camera mounted on truck, tailgate, or bumper may be used to determine whether a camera needs recalibration. The image may be used to determine movement of the camera and to recalibrate image of the camera by transforming and/or cropping the image from the misaligned camera. The movement of camera may be determined by performing edge detection on fixed objects in the image and identifying points or landmarks on the edges. The locations of the points or landmarks can be compared to a pre-stored set of values corresponding to a correctly calibrated image. The difference between pre-stored set of values and identified locations or points may be then used to determine whether the camera has moved and subsequently to recalibrate the camera or image sensor by adjusting the image.

Figure 1:
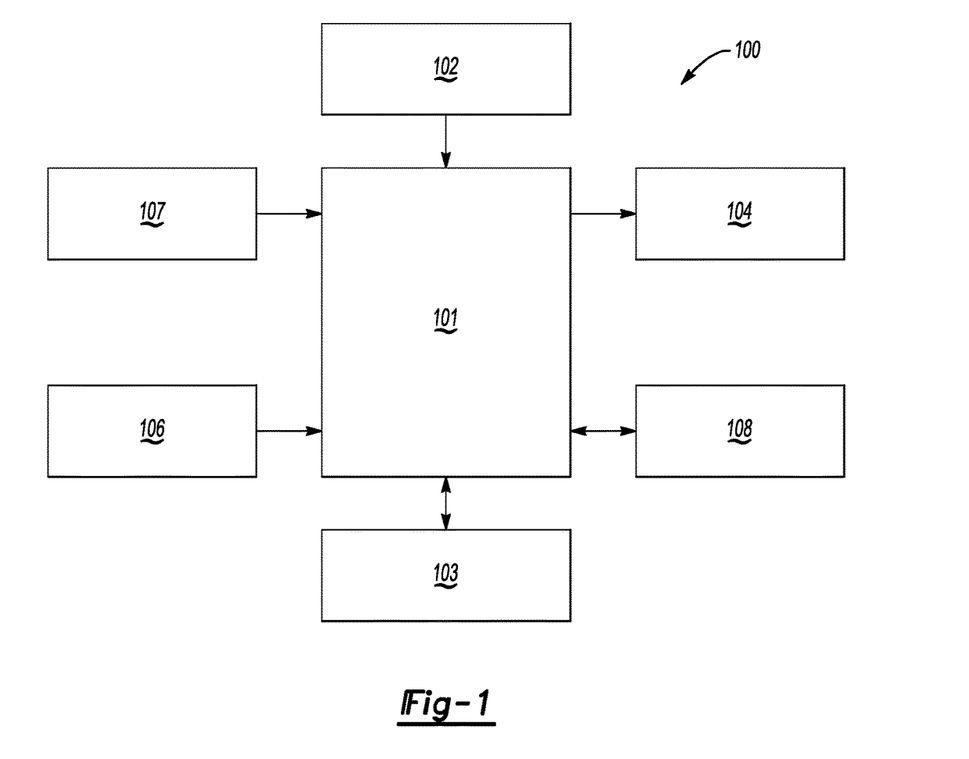
FIG. 1 shows a block diagram of an apparatus that calibrates a camera according to an exemplary embodiment.

FIG. 1 shows a block diagram of an apparatus that calibrates a camera 100 according to an exemplary embodiment. As shown in FIG. 1, the apparatus that calibrates a camera 100, according to an exemplary embodiment, includes a controller 101, a power supply 102, a storage 103, an output 104, a user input 106, an image sensor 107, and a communication device 108. However, the apparatus that calibrates a camera 100 is not limited to the aforementioned configuration and may be configured to include additional elements and/or omit one or more of the aforementioned elements. The apparatus that calibrates a camera 100 may be implemented as part of a vehicle, as a standalone component, as a hybrid between an on vehicle and off vehicle device, or in another computing device.

The controller 101 controls the overall operation and function of the apparatus that calibrates a camera 100. The controller 101 may control one or more of a storage 103, an output 104, a user input 106, an image sensor 107, and a communication device 108 of the apparatus that calibrates a camera 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the image sensor 107, and the communication device 108 of the apparatus that calibrates a camera 100. The information may be sent and received via a bus or network, or may be directly read or written to/from one or more of the storage 103, the output 104, the user input 106, the image sensor 107, and the communication device 108 of the apparatus that calibrates a camera 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the image sensor 107, and the communication device 108, of the apparatus that calibrates a camera 100. The power supply 102 may include one or more from among a battery, an outlet, a capacitor, a solar energy cell, a generator, a wind energy device, an alternator, etc.

The storage 103 is configured for storing information and retrieving information used by the apparatus that calibrates a camera 100. The storage 103 may be controlled by the controller 101 to store and retrieve information received from the image sensor 107. The information may include image information of images taken by the image sensor 107, calibration information including a pre-stored plurality of points of an edge or corner of a fixed object and/or pre-stored horizontal midpoint of an edge of a fixed object, information on pixel distances, etc. The storage 103 may also include the computer instructions configured to be executed by a processor to perform the functions of the apparatus that calibrates a camera 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that calibrates a camera 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. In addition, the output 104 may output an image from the image sensor 107 or camera facing the rear of a vehicle showing the bed of the vehicle and/or an area behind the vehicle including a trailer to which the vehicle is attempting to hitch.

The image from the rear of the vehicle may be processed or be adjusted according to a location of a trailer coupler or trailer. For example, an image may be zoomed, magnified and/or cropped depending on the zone where the trailer is located. In addition, the output 104 may display guidance information. The guidance information may be overlaid onto an image taken by the image sensor 107. The guidance information may be in form of one or more of a guideline, an arrow, or a grid.

The user input 106 is configured to provide information and commands to the apparatus that calibrates a camera 100. The user input 106 may be used to provide user inputs, etc., to the controller 101. The user input 106 may include one or more from among a touchscreen, a keyboard, a soft keypad, a button, a motion detector, a voice input detector, a microphone, a steering device, a camera, a trackpad, a mouse, a touchpad, etc. The user input 106 may be configured to provide information used to re-calibrate the image sensor 107 or a camera by adjusting an image. The information may include a user input to crop or transform an image. The information may also include steering angle or wheel angle information used to adjust the guidance information displayed on the output 104.

The image sensor 107 may include one or more from among a plurality of sensors including an imaging sensor, a camera, a laser sensor, an ultrasonic sensor, an infrared camera, a LIDAR, a radar sensor, an ultra-short range radar sensor, an ultra-wideband radar sensor, and a microwave sensor. The information provided by the image sensor 107 may be used to generate an image. The image may be used analyzed to determine if the image sensor needs recalibration.

In one example, the image sensor 107 may provide one or more images from one or more rear-facing cameras that may be displayed on the output 104. For example, an image from an image sensor 107 embodied as a CHMSL camera may be provided. In another example, an image from an image sensor 107 embodied as a camera mounted on a trunk, tailgate or bumper of a vehicle may be provided.

The communication device 108 may be used by the apparatus that calibrates a camera 100 to communicate with various types of external apparatuses according to various communication methods. The communication device 108 may be used to send/receive information including information from the image sensor 107, calibration information, guidance information, information on vehicle dynamics such as vehicle velocity and vehicle trajectory, to/from the controller 101 of the apparatus that calibrates a camera 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

The controller 101 of the apparatus that calibrates a camera 100 may be configured to detect at least one edge of fixed object in image received from a camera, determine at least one horizontal midpoint of the at least one edge, calculate a first pixel distance between the determined at least one horizontal midpoint and a pre-stored at least one horizontal midpoint, calculate second pixel distances between a plurality of points on the detected at least one edge of the fixed object and a pre-stored plurality of points of the at least one edge of the fixed object, determine whether to recalibrate the camera based on the first pixel distance and the second pixel distances, and recalibrate the camera if the determining determines to recalibrate the camera.

In one example, the controller 101 may determine that camera has moved up or has moved down if the first pixel distance, the second pixel distance, or a difference between the plurality of points of the at least one edge of the fixed object indicate that the plurality of points are above or below the pre-stored plurality of points. In another example, the controller 101 may determine that camera has forward or backward if there is a size difference between an area defined by one or more edges or the plurality of points and a pre-stored area. In yet another example, the controller 101 may determine that camera has rotated if the first pixel distance, the second pixel distance, or the plurality of points indicate an affine movement.

The controller 101 of the apparatus that calibrates a camera 100 may be configured to determine the at least one horizontal midpoint of the at least one edge by determining a horizontal midpoint of an edge corresponding to a gate of the vehicle bed and a horizontal midpoint of an edge corresponding to a side opposite the gate of the vehicle bed.

The controller 101 of the apparatus that calibrates a camera 100 may be configured to determine the at least one horizontal midpoint of the at least one edge by determining a horizontal midpoint of an edge corresponding to the bumper.

The controller 101 of the apparatus that calibrates a camera 100 may be configured to determine whether to recalibrate the camera based on the first pixel distance and the second pixel distances by determining whether the first pixel distance or the second pixel distances are greater than a predetermined threshold distance.

The controller 101 of the apparatus that calibrates a camera 100 may be configured to determine whether to recalibrate the camera based on the first pixel distance and the second pixel distances by further determining whether an affine movement has occurred based on the determined horizontal midpoint and the plurality of points on the at least one edge of the fixed object. For example, if an affine movement has occurred, the camera may have been rotated.

The controller 101 of the apparatus that calibrates a camera 100 may be configured to recalibrate the camera by transforming the received image and re-cropping the transformed image.

The controller 101 of the apparatus that calibrates a camera 100 may be configured to transform the received image by performing an affine transformation on the received image based on the first pixel distance between the determined at least one horizontal midpoint and a pre-stored at least one horizontal midpoint and the second pixel distances between a plurality of points on the detected at least one edge of the fixed object and a pre-stored plurality of points of the at least one edge of the fixed object.

Figure 2:
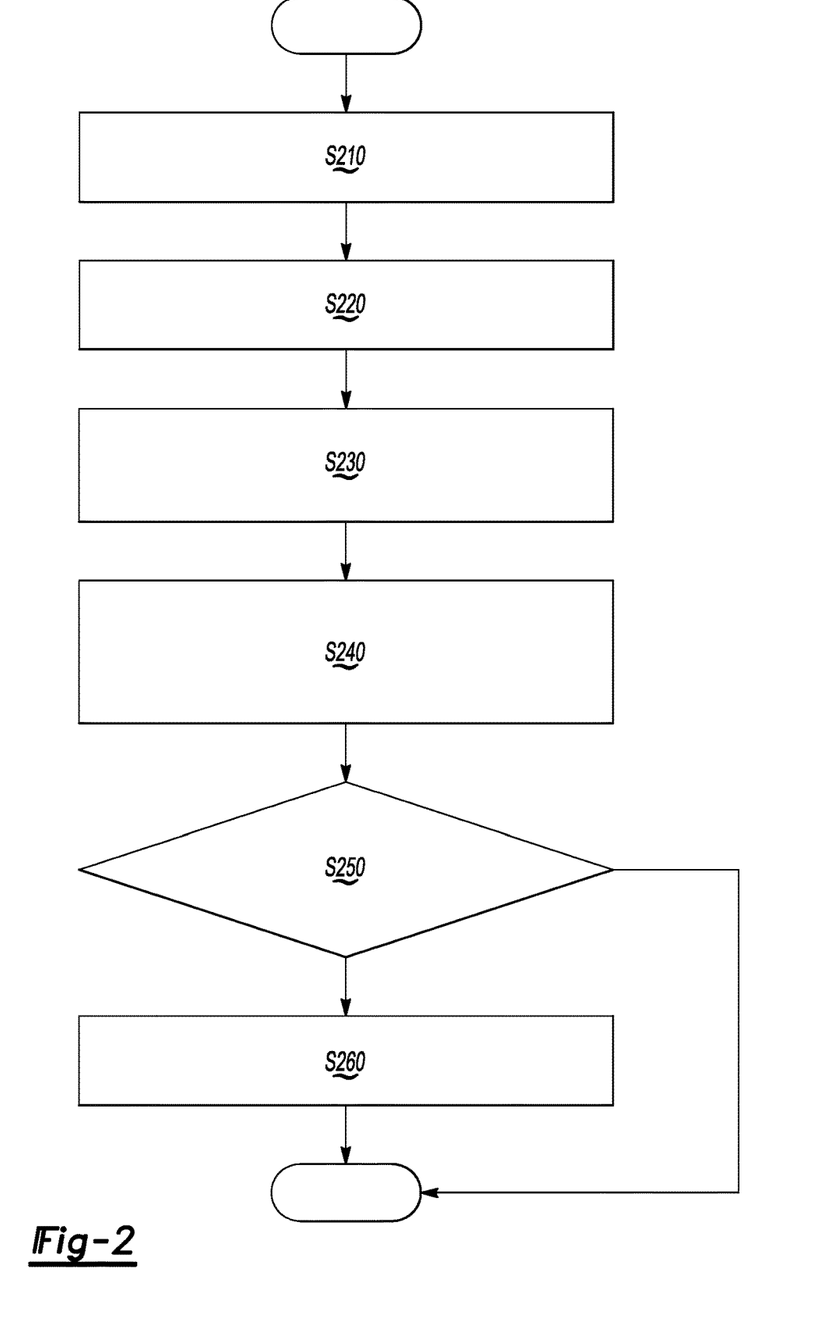
FIG. 2 shows a flowchart for a method of calibrating a camera according to an exemplary embodiment.

FIG. 2 shows a flowchart for a method of calibrating a camera according to an exemplary embodiment. The method of FIG. 2 may be performed by the apparatus that calibrates a camera 100 or may be encoded into a computer readable medium as instructions that are executable by a computer to perform the method.

Referring to FIG. 2, at least one edge of a fixed object is detected in an image received from or of a camera in operation S210. In operation S220, a midpoint of the at least one edge is determined. In addition, a position of a plurality of points on the detected at least one edge may also be determined. The midpoint may be a horizontal midpoint or vertical midpoint of the at least one detected edge.

In operation S230, a first pixel distance between the determined at least one midpoint and a pre-stored at least one midpoint is calculated. Second pixel distances between a plurality of points on the detected at least one edge of the fixed object and a pre-stored plurality of points of the at least one edge of the fixed object are also calculated in operation S240.

Based on the first pixel distance and the second pixel distance, it is determined whether to recalibrate the camera in operation S250. If it is determined to recalibrate the camera (operation S250—Yes), recalibrating the camera is performed in operation S260. Otherwise (operation S250—No), the process ends.

Figure 3A:
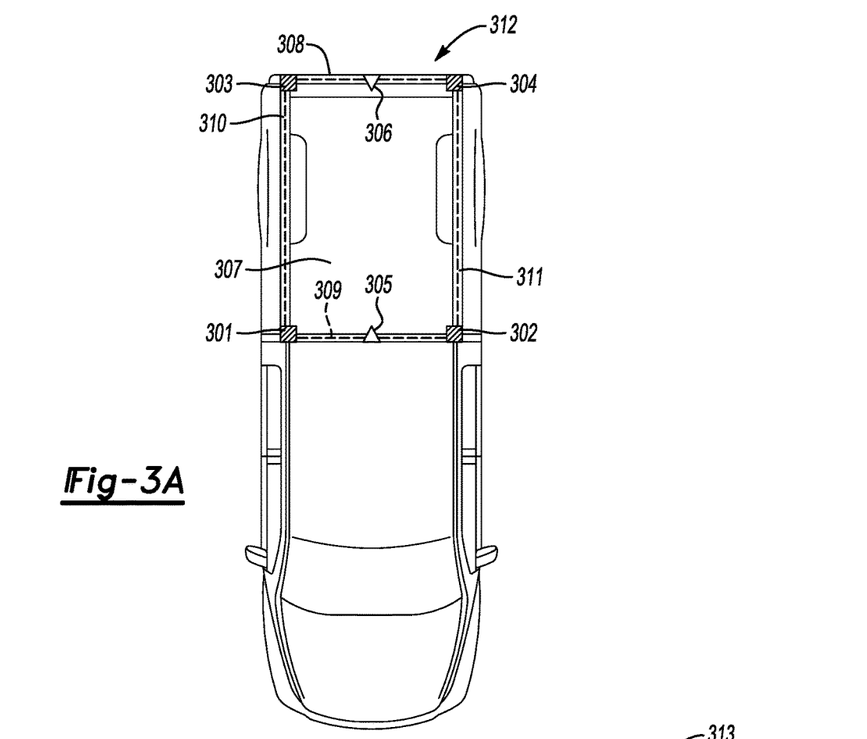
FIGS. 3A-3C show illustrations of images and edges used in a calibration process according to an aspect of an exemplary embodiment.
Figure 3B:
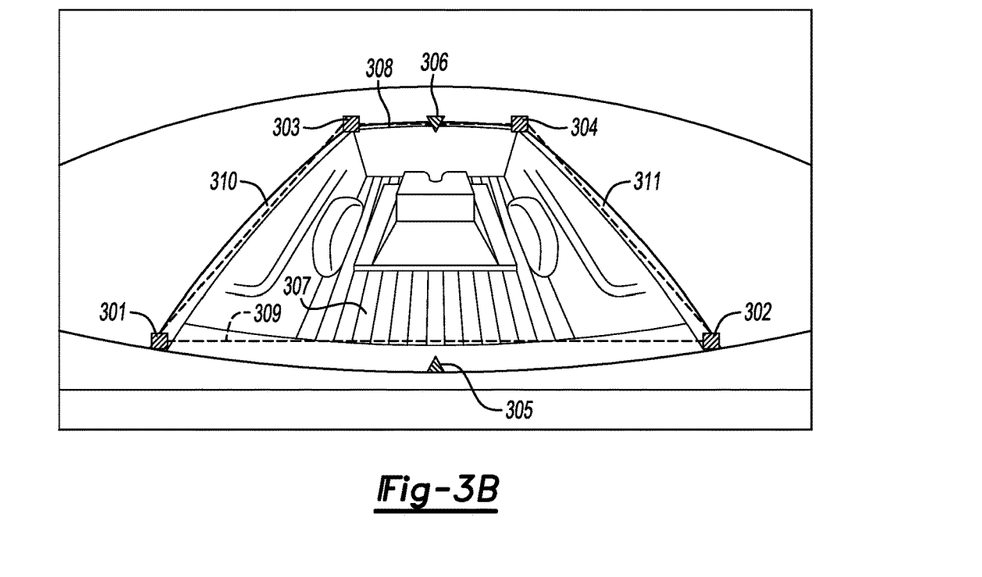
Figure 3C:
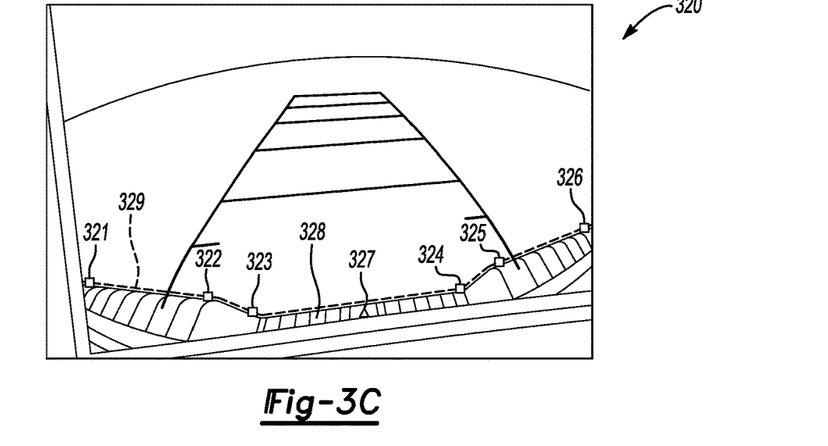

FIGS. 3A-3C show illustrations of images and edges used in a calibration process according to an aspect of an exemplary embodiment. FIG. 3A shows an illustration a top view of a vehicle showing edges and points that may be used recalibrate an image sensor or camera and FIG. 3B shows an illustration of an image 312 from a rear facing CHMSL vehicle camera that may be used to detect the edges and location of points to be used to determine whether recalibration of a camera is required.

Referring to FIGS. 3A and 3B, edges 308-311 are detected in an image 312 of a rear-facing camera. Edge 308 may correspond to a vehicle gate, edge 309 may correspond to a side of the vehicle bed opposite the gate, edge 310 may correspond to an edge parallel to a passenger side of the vehicle bed, and edge 311 may correspond to an edge parallel to a driver side of the vehicle bed.

Based on an image 312 and the detected edges 308-311, a plurality of points 301, 302, 303 and 304 corresponding to corners of the vehicle bed may be determined. In addition, horizontal midpoints 305 and 306 may also be determined. The determined pixel locations of the plurality of points 301-304 and horizontal midpoints 305 and 306 may be compared to pre-stored values of pixel locations to determine whether a camera has moved and/or needs recalibration. In another example, the determined pixel locations of the plurality of points 301-304 and vertical midpoints may be compared to pre-stored values of pixel locations to determine whether a camera has moved and/or needs recalibration.

Referring to FIG. 3C, an image 320 from a tailgate camera shows a bumper 328. After performing edge detection, the edge detection algorithm detects edge 329. A plurality of points 321-326 corresponding to landmarks on bumper 328 may be also be detected. In addition, a horizontal midpoint 327 may be detected. The position of one or more from among the plurality of points 321-326 and the position of horizontal midpoint 327 may be compared to pre-stored information on positions of the plurality of points 321-326 and the horizontal midpoint 327 to determine a pixel difference or distance. This information may then be used to calibrate the camera, image sensor, camera image, etc.

Figure 4:
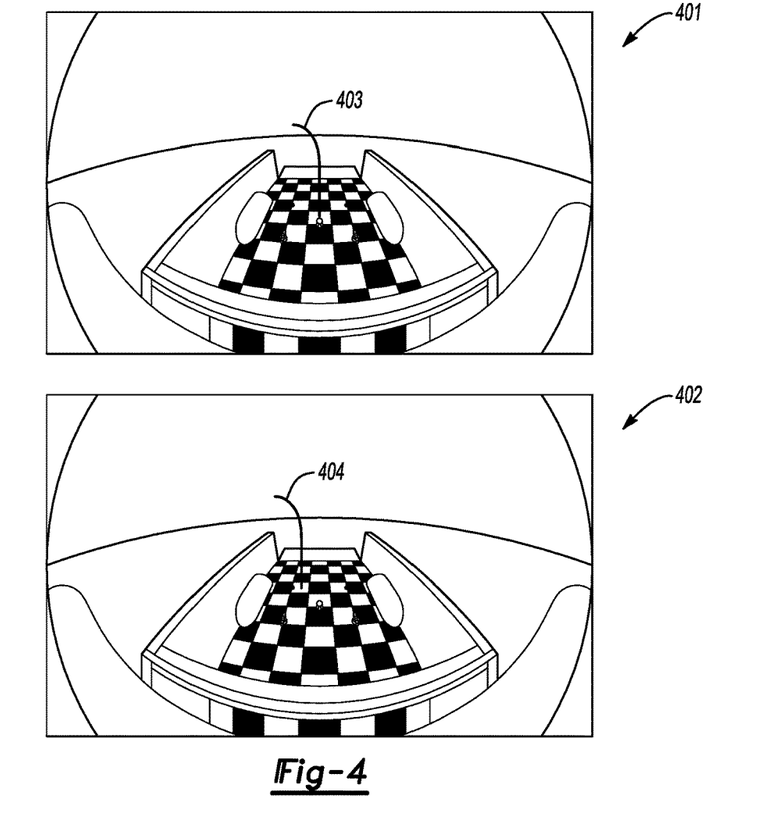
FIG. 4 shows illustrations of images from a calibrated camera and a camera needing recalibration according to an aspect of an exemplary embodiment.

FIG. 4 shows illustrations of images from a calibrated camera and a camera needing recalibration according an aspect of an exemplary embodiment.

Referring to FIG. 4, a first image 401 from a properly calibrated image sensor or camera includes a first guideline 403 that is in an appropriate location corresponding to the location of the hitch in the first image 401. Due to conditions, such as bumps in the road, and gravitational forces, an image sensor may move causing it to lose it calibration. When the image sensor or camera loses calibration, the issues shown in second image 402 may occur. As shown in second image 402, a second guideline 404 is not properly aligned due to the improperly calibrated image sensor, camera, or camera image.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for calibrating a camera, the method comprising:
   detecting at least one edge of fixed object in image received from a camera;
   determining at least one horizontal midpoint of the at least one edge;
   calculating a first pixel distance between the determined at least one horizontal midpoint and a pre-stored at least one horizontal midpoint;
   calculating second pixel distances between a plurality of points on the detected at least one edge of the fixed object and a pre-stored plurality of points of the at least one edge of the fixed object;
   determining whether to recalibrate the camera based on the first pixel distance and the second pixel distances; and
   recalibrating the camera if the determining determines to recalibrate the camera,
   wherein the determining whether to recalibrate the camera based on the first pixel distance and the second pixel distances comprises determining whether the first pixel distance or the second pixel distances are greater than a predetermined threshold distance and determining whether an affine movement has occurred based on the determined horizontal midpoint and the plurality of points on the at least one edge of the fixed object.

2. The method of claim 1, wherein the fixed object comprises a vehicle bed,
   wherein the plurality of points correspond to the corners of the vehicle bed, and
   wherein the determining the at least one horizontal midpoint of the at least one edge comprises determining a horizontal midpoint of an edge corresponding to a gate of the vehicle bed and a horizontal midpoint of an edge corresponding to a side opposite the gate of the vehicle bed.

3. The method of claim 1, wherein the fixed object comprises a bumper,
   wherein the determining the at least one horizontal midpoint of the at least one edge comprises determining a horizontal midpoint of an edge corresponding to the bumper, and
   wherein the plurality of points are points on the bumper corresponding to one or more from among: a) a first end of the bumper and a second end of the bumper; and b) a point between the horizontal midpoint and the first end of the bumper and a point between the horizontal midpoint and the second end of the bumper.

4. The method of claim 1, wherein the recalibrating the camera comprises transforming the received image and re-cropping the transformed image.

5. The method of claim 4, wherein the transforming the received image comprises performing an affine transformation on the received image based on the first pixel distance between the determined at least one horizontal midpoint and a pre-stored at least one horizontal midpoint and the second pixel distances between a plurality of points on the detected at least one edge of the fixed object and a pre-stored plurality of points of the at least one edge of the fixed object.

6. The method of claim 1, wherein the camera comprises a camera imaging an area behind a vehicle including the vehicle bumper or a camera imaging an area including a vehicle bed.

7. The method of claim 1, wherein the plurality of points comprises four points or six points.

8. A non-transitory computer readable medium comprising instructions executable by a computer to perform the method of claim 1.

9. An apparatus for calibrating a camera, the apparatus comprising:
   at least one memory comprising computer executable instructions; and
   at least one processor configured to read and execute the computer executable instructions, the computer executable instructions causing the at least one processor to:
   detect at least one edge of fixed object in image received from a camera;
   determine at least one horizontal midpoint of the at least one edge;
   calculate a first pixel distance between the determined at least one horizontal midpoint and a pre-stored at least one horizontal midpoint;
   calculate second pixel distances between a plurality of points on the detected at least one edge of the fixed object and a pre-stored plurality of points of the at least one edge of the fixed object;
   determine whether to recalibrate the camera based on the first pixel distance and the second pixel distances; and
   recalibrate the camera if the determining determines to recalibrate the camera;

wherein the computer executable instructions cause the at least one processor to determine whether to recalibrate the camera based on the first pixel distance and the second pixel distances by determining whether the first pixel distance or the second pixel distances are greater than a predetermined threshold distance and further determining whether an affine movement has occurred based on the determined horizontal midpoint and the plurality of points on the at least one edge of the fixed object.

10. The apparatus of claim 9, wherein the fixed object comprises a vehicle bed,
wherein the plurality of points correspond to the corners of the vehicle bed, and
wherein the computer executable instructions cause the at least one processor to determine the at least one horizontal midpoint of the at least one edge by determining a horizontal midpoint of an edge corresponding to a gate of the vehicle bed and a horizontal midpoint of an edge corresponding to a side opposite the gate of the vehicle bed.

11. The apparatus of claim 9, wherein the fixed object comprises a bumper,
wherein the plurality of points are points on the bumper corresponding to one or more from among: a) a first end of the bumper and a second end of the bumper; and b) a point between the horizontal midpoint and the first end of the bumper and a point between the horizontal midpoint and the second end of the bumper, and
wherein the computer executable instructions cause the at least one processor to determine the at least one horizontal midpoint of the at least one edge by determining a horizontal midpoint of an edge corresponding to the bumper.

12. The apparatus of claim 9, wherein the computer executable instructions further cause the at least one processor to recalibrate the camera by transforming the received image and re-cropping the transformed image.

13. The apparatus of claim 12, wherein the computer executable instructions further cause the at least one processor to transform the received image by performing an affine transformation on the received image based on the first pixel distance between the determined at least one horizontal midpoint and a pre-stored at least one horizontal midpoint and the second pixel distances between a plurality of points on the detected at least one edge of the fixed object and a pre-stored plurality of points of the at least one edge of the fixed object.

14. The apparatus of claim 9, further comprising a camera imaging an area behind a vehicle including the vehicle bumper.

15. The apparatus of claim 9, further comprising a camera imaging an area including a vehicle bed.

16. The apparatus of claim 9, wherein the plurality of points comprises four points or six points.

* * * * *